United States Patent
Hu et al.

(10) Patent No.: US 7,953,728 B2
(45) Date of Patent: May 31, 2011

(54) QUERIES WITH SOFT TIME CONSTRAINTS

(75) Inventors: Ying Hu, Nashua, NH (US); Seema Sundara, Nashua, NH (US); Jagannathan Srinivasan, Nashua, NH (US)

(73) Assignee: Oracle International Corp., Redwood Shores, CA (US)

(*) Notice: Subject to any disclaimer, the term of this patent is extended or adjusted under 35 U.S.C. 154(b) by 591 days.

(21) Appl. No.: 11/804,502

(22) Filed: May 18, 2007

(65) Prior Publication Data

US 2008/0288446 A1    Nov. 20, 2008

(51) Int. Cl.
    *G06F 17/30* (2006.01)
(52) U.S. Cl. .................... 707/719; 707/720
(58) Field of Classification Search .............. None
    See application file for complete search history.

(56) References Cited

U.S. PATENT DOCUMENTS

| | | | |
|---|---|---|---|
| 2004/0002956 A1* | 1/2004 | Chaudhuri et al. | 707/2 |
| 2004/0003004 A1* | 1/2004 | Chaudhuri et al. | 707/200 |
| 2006/0075304 A1 | 4/2006 | Canning et al. | |
| 2008/0181536 A1* | 7/2008 | Linden | 382/313 |

OTHER PUBLICATIONS

Lee et al. (Proceedings of the fifth international conference on Information and knowledge management, Nov. 1996, pp. 279-287).*
Hu et al, "Supporting Time-Constrained SQL Queries in Oracle, Proceedings of the 33rd international conference on Very large data bases, 2007".*
US Non-Final Office Action in co-pending U.S. Appl. No. 11/804,508, filed May 18, 2007 having a Notification Date of Jun. 12, 2009.
Hou et al. (ACM SIGMOD vol. 18, Issue 2, Jun. 1989, pp. 68-77).
US Final Office Action in co-pending U.S. Appl. No. 11/804,508, filed May 18, 2007 having a Notification Date of Dec. 18, 2009.

* cited by examiner

*Primary Examiner* — Charles Kim
*Assistant Examiner* — Anteneh Girma
(74) *Attorney, Agent, or Firm* — Kraguljac & Kalnay, LLC

(57) ABSTRACT

Systems, methodologies, media, and other embodiments associated with supporting queries with soft time constraints are described. One exemplary system embodiment includes logic for accepting a query having a soft time constraint. The example system may also include logic for rewriting the query having the soft time constraint into a query having a row limitation or a sample percentage limitation. In one example, the row limitation or sample percentage limitation are computed by repetitively comparing an estimated query execution time to the soft time constraint.

30 Claims, 5 Drawing Sheets

QUERIES WITH SOFT TIME CONSTRAINTS

CROSS-REFERENCE TO RELATED APPLICATION

This application is related to the following U.S. patent application, which is assigned to the present assignee: titled, "QUERIES WITH HARD TIME CONSTRAINTS", Ser. No. 11/804,508 filed May 18, 2007, inventors: Y. Hu, S. Sundara, & J. Srinivasan.

BACKGROUND

Databases continue to grow to ever larger sizes. These large databases and their associated query languages (e.g., structured query language (SQL)) allow flexibility for arbitrarily complex formulations. This may result in queries that take inordinate and/or unknowable amounts of time to complete. Conventional strategies to limit the impact of such queries involve a user optimizing a query to return the "first-few rows" or "a sample of rows" from a search space (e.g., table, set of tables). However, these strategies may produce queries having unknown or unpredictable query processing times.

Growth in the amount of information being generated and stored has lead to larger and larger databases. The widespread, sophisticated use of SQL has led to the formulation of arbitrarily complex queries that may involve the joins of many tables, the grouping and sorting of results, the use of sub-queries, and the use of user-defined functions as filtering predicates. These two trends have introduced and exacerbated problems associated with long running SQL queries.

Conventional approaches for addressing issues associated with long running SQL queries compute either partial or approximate results quickly. However, the onus of employing these approaches intelligently is left to the user. Given the sophistication of cost-based optimizers that are now common in commercial database systems, it may not be easy for a user to translate a time constraint to an appropriate top-k or approximate query.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
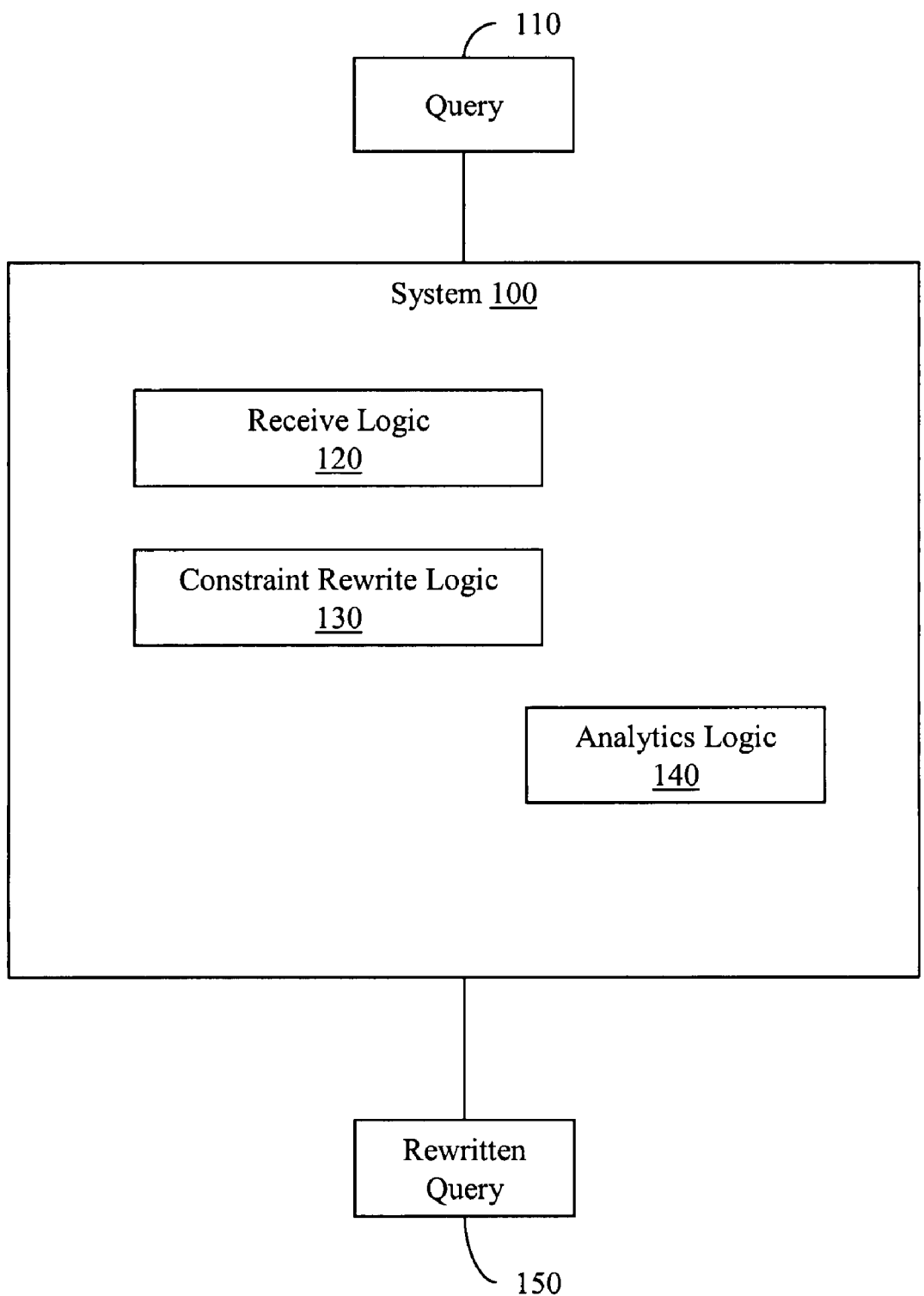
FIG. 1 illustrates an example system to support time-constrained queries.
Figure 2:
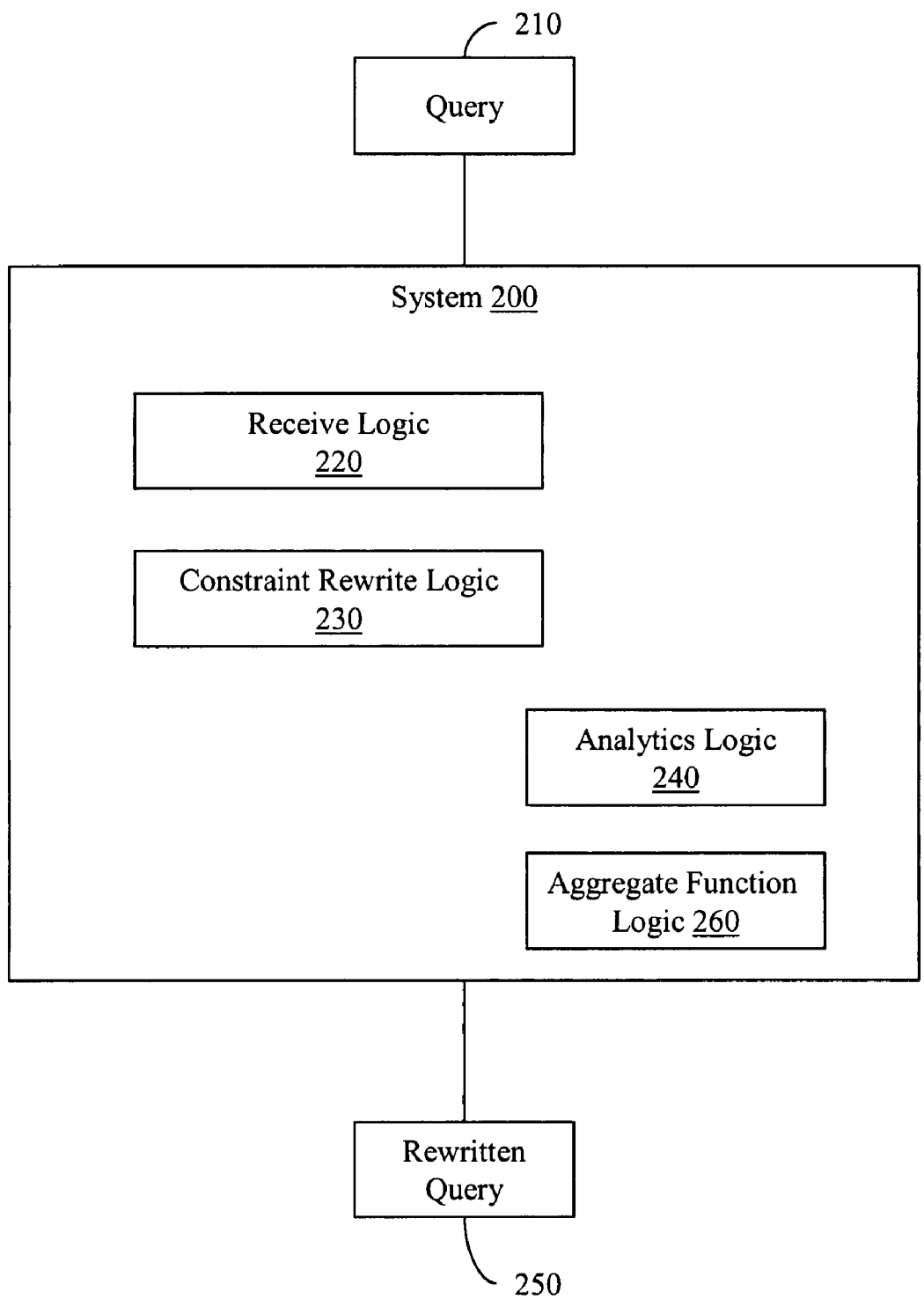
FIG. 2 illustrates another example system to support time-constrained queries.

Example systems and methods support processing time-constrained queries. The time-constrained queries are to be executed in a predictable, controllable, period of time. Thus, example systems and methods may accept a query (e.g., SQL query) that includes a soft time constraint that will be treated as a suggested upper bound for query processing time. A soft time constraint is not a hard time constraint after which a query will terminate, but rather a proposed goal for query execution time. The query may also indicate the type of results (e.g., partial, approximate) that the query may produce if tradeoffs are to be made between accuracy, completeness, and predictable execution time. When tradeoffs are to be made, example systems and methods may internally transform a query so that it is predicted to complete in the amount of time associated with the soft constraint.

An example DBMS (database management system) may consider the criteria (e.g., time limit, constraint type, quality of result) while generating a query execution plan. The query execution plan may be analyzed by DBMS analytics (e.g., time estimators, execution plan creators) to determine how long the plan is expected to take to complete. If a transformation of the query is to be made, then the transformation can be controlled based on a query optimization mode suggested in the query. For example, if partial results are acceptable then reducing the result set cardinality may be employed. In another example, if approximate results are acceptable then sampling of a data set(s) (e.g., table(s)) may be employed. When sampling is employed, results may be approximate. Therefore, example systems and methods may include logic to provide additional aggregate functions that may estimate aggregate values and provide a confidence interval associated with the estimated aggregate value.

To support identifying time constraints and query optimization modes, example systems and methods support processing additional clauses in an SQL query. The additional clauses may specify a soft constraint time (e.g., time limit in seconds), and an acceptable nature of results (partial, approximate). When a time constraint is included in a query, a DBMS configured with example systems and/or methods may generate a query execution plan that is expected to complete in the allocated time. The acceptable nature of results determines a technique(s) employed by the DBMS to constrain execution time. Determining how to limit a table or set of tables to achieve the desired execution time is described below.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

"Logic", as used herein, includes but is not limited to hardware, firmware, software in execution, and/or combinations of each to perform a function(s) or an action(s), and/or to cause a function or action from another logic, method, and/or system. Logic may include a software controlled microprocessor, discrete logic (e.g., an application specific integrated circuit (ASIC)), an analog circuit, a digital circuit, a programmed logic device, a memory device containing instructions, and so on. Logic may include a gate(s), combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions in execution that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software, whether an entire system or a component of a system, may be embodied as an article of manufacture and maintained or provided as part of a computer-readable medium as defined previously.

"User", as used herein, includes but is not limited to one or more persons, software, computers or other devices, or combinations of these.

FIG. 1 illustrates a system 100 to support time-constrained queries. System 100 includes a receive logic 120 to receive a query 110. Query 110 may have a clause that specifies a soft time constraint. In one example, query 110 may also include a clause that specifies an acceptable result type (e.g., partial, approximate).

System 100 includes a constraint rewrite logic 130 to manipulate the received query 110 into a rewritten query 150. How the query 110 is to be manipulated by constraint rewrite logic 130 may depend on the information (e.g., time constraint, the acceptable result type) specified in the additional clauses, and information gathered about an execution plan for the query 110. The information may be gathered from, for example, a database analytics logic 140. Analytics logic 140 may estimate the amount of time a query proposed by constraint rewrite logic 130 will consume based, for example, on information available in an execution plan. The execution plan may be provided by a DBMS. Analytics logic 140 may predict execution time for an original query 110, a rewritten query 150, and/or queries proposed by constraint rewrite logic 130 as candidates for rewritten query 150. Based on the predicted execution time, the constraint rewrite logic 130 may further rewrite a proposed query until a desired execution time is achieved. This query may then be provided as rewritten query 150.

Example systems and methods may interact with a Decision Support System (DSS). In traditional DSS environments, users produce complex aggregate queries that may result in long processing times. The user may not be interested in full query results but only in partial results to spot trends (e.g. growth rate of sales in different regions). By using a time-constrained query, a user can obtain these types of results within a shorter, predictable time.

Example systems and methods may also interact with mobile network applications. In some mobile applications, the user is interested in complex select queries with top-k results, which are often bound by time. Consider a user who expects to pass a certain location in the next 2 minutes and is interested in finding out if there are any coffee shops and/or gas stations that accept a certain credit card near that location. Results returned after the 2 minutes have passed are useless to the user. Thus a query may be modified with a time constraint to produce a useful result in a relevant time frame.

Example systems and methods may also interact with RFID (radio frequency identification) applications. Sensors associated with RFID applications may generate voluminous data tracking objects. Time-constrained queries can facilitate generating approximate statistics regarding objects detected by RFID sensors in a timely (e.g., relevant) manner.

Example systems and methods may also facilitate data center service level management. Consider a data center that employs a Service Level Agreement (SLA) to ensure quality and codify customer expectations. This type of system may flag queries that take an unacceptable amount of time to execute. The time period may indicate issues with resource availability, execution plans, an unselective filter, and so on. Example systems and methods may impose a time constraint on selected queries to facilitate satisfying the SLA.

Analytics logic 140 may interact with database analytic tool(s), including for example, a cost-based optimizer. Analytics logic 140 may also rely on statistics available in a DBMS including system level statistics, object level statistics, and so on.

System 100 may support creating and/or executing a time-constrained SQL query by transforming (e.g., rewriting) a query based on a cost-based optimizer estimate of the processing time for the rewritten query. In one example, receive logic 120 may accept an SQL SELECT statement that has been extended by a TIME CONSTRAINT (T) clause (where T indicates time in seconds) and a result set characteristic (e.g., approximate or partial) clause. The resulting query syntax may appear as:

```
SELECT ... FROM ... WHERE ...
GROUP BY ... HAVING ...
ORDER BY ...
SOFT TIME CONSTRAINT (T)
WITH {APPROXIMATE|PARTIAL} RESULT;
```

A default "approximate" result may be applied if no approximate/partial identifier is provided. In one example T may be a value (e.g., integer) while in another example T may be an expression.

To support soft time constraints, constraint rewrite logic 130 may transform query 110 by either augmenting it with a ROWNUM clause that reduces the result set size, or augmenting it with a SAMPLE clause that reduces the data blocks scanned and the intermediate result size returned from the referenced table(s). The ROWNUM clause approach may be used for partial results and the SAMPLE clause approach may be used for approximate results. Constraint rewrite logic 130 may determine a value for a parameter associated with the ROWNUM or SAMPLE clause. For example, constraint rewrite logic 130 may select a number of rows (e.g., R) to be retrieved and/or a percent chance (e.g., S) for an item (e.g., row, block of rows) to be included in a sample.

Sampling may be applied to either rows or blocks. Which type of sampling is applied may depend on an underlying access method. For example, full table scans may employ block sampling while index range scans may employ row sampling. When multiple tables are involved in a query, constraint rewrite logic 130 may determine to which table(s) a ROWNUM or SAMPLE clause will be added.

In the following example, query Q1 may correspond to query 110 and query Q1-T may correspond to rewritten query 150. Consider the following time-constrained SQL query to retrieve 'APPROXIMATE' results:

| Q1: |
| --- |
| SELECT AVG(salary)<br>FROM employees<br>SOFT TIME CONSTRAINT (50)<br>WITH APPROXIMATE RESULT; |

The query Q1 is constrained to be completed with approximate results in about 50 seconds. Constraint rewrite logic 130 may transform Q1 to:

| Q1-T: |
| --- |
| SELECT AVG(salary)<br>FROM employees SAMPLE BLOCK (10); |

In Q1-T, the sample clause specifies the percentage of the sample size. Thus, in query Q1-T, only about 10% of table blocks are accessed in computing the average, which may reduce the overall query processing time. Thus, adding the SAMPLE BLOCK clause to query Q1-T is expected to cause the transformed query to complete in the constraint time period. Constraint rewrite logic 130 may estimate the result set cardinality in the case of partial results or the sample size in the case of approximate results. The estimate may be based, at least in part, on database analytics provided by analytics logic 140. The database analytics may include, for example, a tool that explains an execution plan for a query. Data from the tool can therefore be used to determine either the sample size or the number of rows to return.

The constraint rewrite logic 130 may estimate the number of rows to return for a query. To estimate the result set size for partial results (e.g., value for ROWNUM parameter), let the function $f_Q(r)$ represent the time to execute query Q, which depends on result set size r. Thus, $f_Q(r)=T$, where T is the specified time constraint. The desired r is a root of the equation:

$$f_Q(r)-T=0$$

which may be obtained by the constraint rewrite logic 130 using a root finding algorithm (e.g., false position). Thus, in one example, constraint rewrite logic 130 may select a value for the number of rows associated with a partial result by computing a root for equation $f_Q(r)-T=0$.

The constraint rewrite logic 130 may estimate the sample size for a single table query (e.g., value for SAMPLE parameter) in a similar manner. Let the function $f_Q(s)$ represent the time to execute query Q, which depends on sample size s. Thus, $f_Q(s)=T$, where T is the specified time constraint. The desired s is a root of the equation:

$$f_Q(s)-T=0$$

which may also be obtained by the constraint rewrite logic 130 using a root finding algorithm. In one example, the constraint rewrite logic 130 may consider data provided by the analytics logic 140 when estimating. For example, analytics logic 140 may provide data provided by the EXPLAIN PLAN feature of a database management system which may then be used to estimate $f_Q(r)$ and/or $f_Q(s)$.

Constraint rewrite logic 130 may also select numbers of rows or sample sizes for queries that involve multiple tables. Additionally, constraint rewrite logic 130 may determine which tables, if any, should be sampled in a multi-table situation. In one example, for queries involving joins of tables via a foreign key, the constraint rewrite logic 130 may determine to apply a sampling clause to just a fact table. In another example, for queries that do not involve joins on a foreign key, the constraint rewrite logic 130 may also determine a table(s) to which a sampling clause is to be applied and the sample size for the selected table(s).

To review, FIG. 1 illustrates a system 100 having a receive logic 120 to receive a first query 110 having a soft time constraint. The soft time constraint may be considered to be a desired upper bound for the execution time of the first query 110. In different examples, the soft time constraint may be a numerical value representing a number of seconds, an expression that evaluates to a number of seconds, a clock time by which the rewritten query is to complete, and so on. System 100 also includes an analytics logic 140 to provide data (e.g., a predicted execution time for a query) upon which rewriting determinations can be made. System 100 may also include a constraint rewrite logic 130 to selectively produce a rewritten query 150 based on the first query. Rather than have a time constraint clause, the rewritten query 150 may have a restricted result clause determined by a predicted execution time.

Time-constrained queries that involve aggregates and SAMPLE clauses may be analyzed in light of information provided by user-defined aggregate functions. Figure two illustrates a system 200 to support queries having soft time constraints. System 200 includes some elements similar to those associated with system 100 (e.g., receive logic 220, constraint rewrite logic 230, and analytics logic 240). System 200 may also include an aggregate function logic 260 to provide functions that estimate aggregate values including, for example, estimated sum, estimated count, estimated average, and so on. These functions may estimate aggregate values for complete table data even though only a portion of a table is used to compute the aggregates. Additionally, aggregate function logic 260 may provide functions that describe confidence intervals quantifying the uncertainty in the corresponding estimated aggregate values. These aggregate functions provide information a user may examine to evaluate the quality, usefulness, and/or relevance of an approximate aggregate result.

Consider the following query having built-in and user-defined aggregate functions:

| Q2: |
|---|
| SELECT COUNT(*),<br>estimatedAvg(salary),<br>avgConfidence(salary, 95)<br>FROM employees<br>SOFT TIME CONSTRAINT (50)<br>WITH APPROXIMATE RESULT; |

This query returns the actual count for the sampled portion of an employees table, the estimated average salary for the entire employees table, and the confidence interval (e.g., c) indicating that the estimated average salary is within ±c of the actual computed average salary, with 95 percent probability. When the time constraint is large enough to process the entire employees table, an estimated sum and estimated count would return the same values as actual aggregate functions (e.g., SUM, COUNT), and the confidence interval functions would return 0 (indicating actual results).

Both the estimated aggregates and the confidence interval functions utilize collected statistics (e.g., histograms) and run-time query results to refine their final values. The estimated aggregates and the confidence interval functions provide data to help users determine the nature of error in the returned results.

In one example, characteristics of time-constrained SQL query results are maintained in an in-memory data structure. This data structure may be stored, for example, in constraint rewrite logic 230 and may be made available to users via a view (e.g., EXPLAIN_TQ_RESULTS (RESULT_TYPE, NUMROWS, ESTIMATED_NUMROWS, COMMENT). The RESULT_TYPE column displays 'PARTIAL' or 'APPROXIMATE', NUMROWS gives number of rows returned, ESTIMATED_NUMROWS column gives the result set cardinality, and COMMENT contains any additional comment regarding the result. For example, when the ROWNUM filter condition is used for the case of partial results, the estimated total number of resultant rows for the following query:

| Q3: |
|---|
| SELECT salary, MAX(tax)<br>FROM tax_return<br>GROUP BY salary<br>ORDER BY salary DESC<br>SOFT TIME CONSTRAINT (10)<br>WITH PARTIAL RESULT; | can be obtained by querying the EXPLAIN_TQ_RESULTS view as follows:

| SELECT RESULT_TYPE, NUMROWS, ESTIMATED_NUMROWS<br>FROM EXPLAIN_TQ_RESULTS; | | |
|---|---|---|
| RESULT_TYPE | NUMROWS | ESTIMATED_NUMROWS |
| PARTIAL | 100000 | 1000000 |

Analytics logic 240 may also acquire information from statistics packages (e.g., DBMS_STATS). These statistics packages may collect and modify object-level statistics (e.g., number of blocks, number of rows, height of an index), system statistics (e.g., average number of CPU cycles per second, average time to read a single block (random read), average time to read multi-blocks at once (sequential read)), and so on. Object-level statistics and system statistics may be used by an optimizer to calculate CPU and IO costs for access methods in a SQL query. Analytics logic 240 may therefore use these calculations to estimate a total elapsed time.

A database system may provide information concerning an execution plan to be followed to execute a specified SQL statement. For example, an Oracle DBMS may provide the EXPLAIN PLAN utility that will provide an execution plan. An execution plan describes steps of an SQL execution plan, (e.g., join order in multi-table join query) and how tables are accessed (e.g., full table scan, indices). An optimizer may, therefore, not only choose a plan for a query but also may estimate the resulting data set size and the elapsed time in the steps in the plan. Thus, analytics logic 240 may interact with an execution plan when estimating a predicted execution time.

Database systems may support random sampling in a SQL query to allow users to find overall patterns from a smaller sized sample. In general, there are two classes of sampling methods: row sampling and block sampling. Row sampling may retrieve every row and then decide whether this row is included in a sample. This may be modeled by retrieving a row and then "rolling a die" to decide whether to keep the row. The number of faces on the die may be controlled by a sample percentage parameter. Thus, row sampling may not outperform some queries that do not perform sampling (e.g., a single table full scan query). However, row sampling can still reduce the data set, which can have performance benefits if the results have to be further processed by expensive operations (e.g., sort). Block sampling is similar to row sampling, except that blocks are sampled. Since block sampling can reduce the number of I/Os, the query with block sampling can run faster than the original query. However, if there is a high degree of column value clustering in the blocks, block sampling may not be as accurate as row sampling to represent the entire dataset. In the presence of indexes, block sampling can be applied on the index blocks only when the optimizer chooses an index fast full scan. For other types of index scans (unique scan, range scan) an optimizer can apply row sampling for the index rows. Since different sampling techniques are available, constraint rewrite logic 230 may rewrite query 210 into rewritten query 250 by adding clauses that will perform the different types of sampling. This rewriting may include selecting a table(s) for which row selection will be limited and selecting a method and amount by which the selection will be limited.

For a time-constrained query having a 'WITH PARTIAL RESULT', clause, input query 210 may be modified with a 'ROWNUM<=RNO' predicate. Limiting the number of rows facilitates having the query execute within the specified time constraint. In one example, RNO may be obtained by constraint rewrite logic 230 using a root finding algorithm and an approach like that provided below.

Q := Original Query;
T := Time Constraint;
ER := Estimated # of result rows from Q;
RNO := The # used in the ROWNUM predicate;
ET := Estimated time from explain plan for Q;
ET(RNO) := Estimated time from explain plan for
SELECT * FROM (Q) WHERE ROWNUM <= RNO;
  explain plan for Q to obtain ER and ET;
  if (ET <= T) return Q;
  else {
    explain plan for
    SELECT * FROM (Q) WHERE ROWNUM <= 1;

-continued

```
    if (ET(1) > T)
return 'ERROR: NEED AT LEAST $ET(1) s';
    else {
        RNO = root_finding_algorithm(1, ER, (ET(1)–T), (ET–T), T, Q);
        return
'SELECT * FROM (Q) WHERE ROWNUM <= RNO';
    }
}
```

In one example the false position method may be used as the root finding algorithm. While the false position method is described, it is to be appreciated that other root finding algorithms may be employed. To summarize, constraint rewrite logic 230 may select an initial value (R) for the number of rows to be selected from a table. A predicted execution time for a query limited to return R rows can then be computed using the initial value R. Additional values for R may be selected until the predicted time meets a threshold associated with the time constraint.

After optimizing for response time, query Q3 may be rewritten as:

---
Q3-T:

SELECT *
FROM (SELECT salary, MAX(tax)
    FROM tax_return
    GROUP BY salary
    ORDER BY salary DESC)
WHERE ROWNUM <= RNO;
---

When the time constraint is inadequate to return the first single row, an error may be returned with information describing, for example, a lower-bound time limit above which the time-constrained query would likely yield a first row.

For a time constrained query having a 'WITH APPROXIMATE RESULT' clause, constraint rewrite logic 230 may transform the query by implementing sampling on some table(s). Tables and sample percentages are selected so that the estimated time to execute the transformed query is predicted to be within the specified time constraint. Since a random sample is used, results for queries that include aggregates may be approximate. This 'APPROXIMATE' mode can reduce the query processing costs by using sampling. Therefore, aggregate function logic 260 may provide additional functions. For example, additional functions that provide values associated with an estimated sum, sum confidence, estimated count, count confidence, estimated average, and/or average confidence can provide information about how well the approximate results have been computed.

Sampling may involve different processing in different situations. One situation is a query on a single table. Long running queries over a single table typically use a full table scan. Thus, in one example, the query transformation performed by constraint rewrite logic 230 involves augmenting query 210 with a sample block clause for the table. The sample size is obtained using a root finding algorithm that may be based, for example, on EXPLAIN PLAN trials. To summarize, constraint rewrite logic 230 may select an initial value (S) for the sample size to which row selection will be limited. A predicted execution time for a query limited to return a sample size limited to S can then be computed using the initial value. Additional values for S may be selected until the predicted time for a query can be constrained by S meets a threshold with respect to the time constraint.

Another situation involves a multi-table query with a foreign key join. In this situation, a uniform random sample over foreign-key joins of tables can be achieved through a uniform random sampling over the fact table and joining with other dimension tables. The fact table may be sampled because it generally is larger and/or because sampling the fact table will in effect sample the other table (e.g., non-fact table) involved in the join. Thus, constraint rewrite logic 230 may analyze table structures (e.g., foreign keys, primary keys) and determine which table is a fact table. The sample size(s) for the fact table may then be obtained using a root finding algorithm based, for example, on EXPLAIN PLAN trials. Like the single table situation, an initial value for S may be selected by the constraint rewrite logic 230 and then additional values for S may be selected and considered until a predicted time for a query constrained by S meets a threshold with respect to the time constraint.

The presence of foreign keys and/or primary keys does not mean that a purportedly optimal execution plan will utilize the index structures associated with these keys. For example, a hash join method may perform better than an index nested-loop join method when the index is not clustered. One table will be the fact table and other tables will be joined through the foreign key either directly from the fact table or from the already joined tables. The primary key/foreign key requirements normally hold for many well-defined (normalized) schemas.

Another situation involves a multi-table query without a foreign key join. When some tables are joined without foreign keys, even in the presence of other tables being joined with foreign keys, example systems (e.g., 100, 200) and methods (e.g., 300, 400) may seek to return as many resulting rows as possible. When a query involves aggregates, example systems and methods that perform the query may seek to sample as many rows as possible in the resultant joins. The following section describes example processing associated with different joins. Constraint rewrite logic 230 may rewrite query 210 into rewritten query 250 in a manner that facilitates returning a desired number of rows from the resultant joins. This processing may be performed by constraint rewrite logic 230 to select values for a row number parameter and/or a sample percentage parameter.

Let $R_1$, $R_2$ be two tables to be joined, let $f_1$, $f_2$ be the sample size for the two tables respectively, and let f be the sample size corresponding to the join result. Consider samples $S_1$=SAMPLE $(R_1, f_1)$, $S_2$=SAMPLE$(R_2, f_2)$, and S=SAMPLE$(R_1$ join $R_2$, f). Since S=SAMPLE $(R_1$ join $R_2$, f) requires more time than $S_1$ join $S_2$={SAMPLE$(R_1, f_1)$ join SAMPLE$(R_2, f_2)$}, example systems and methods may implement the latter case (e.g., sampling prior to join). Observe that $f_1*f_2$ is the upper bound and therefore sampling may seek to maximize $f_1*f_2$ while meeting the time constraint.

Assume that $T_1$ is the total time to process $R_1$ and $T_2$ is the total time to process $R_2$. The total query time T can be simplified as:

$$T = T_1 + T_2.$$

Note that $T_1$ and $T_2$ do not mean the time to simply scan $R_1$ and $R_2$. $T_1$ and $T_2$ can also include the time to sort a table and to hash-build or probe a table. In a nested loop join case, the total time to process an inner relation includes the time to scan the inner relation as many times as needed. Therefore, $t_1$ and $t_2$ can specify the time to process $S_1$ and $S_2$. In one example, $S_1$ and $S_2$ are selected by constraint rewrite logic 230 to have t1=t2 while maintaining $t_1+t_2<$Time$_{constraint}$. In one example, candidate tables are identified and initial sample sizes are selected. A table with a largest predicted processing time may be processed first. Smaller tables may then be analyzed and sample sizes selected to maintain $t_i=ft_j$ with the sum of $t_i$ for i=1 to n being less than the constraint time, n being the number of tables.

Processing associated with nested loop join, hash join, and sort-merge join are described below. This processing may be performed by constraint rewrite logic 130, constraint rewrite logic 230, method 300, and/or method 400. Consider a nested loop join as the join method for $S_1$ join $S_2$, where $S_1$ and $S_2$ are the outer relation and inner relation that are block-sampled directly from $R_1$ and $R_2$. In this case, the total time for processing $S_1$ join $S_2$ can be described according to:

$$T=t_1(f_1)+t_2(f_1,f_2)=f_1*T_1+f_1*f_2*T_2.$$

Thus the time to process $S_1$ is linear to the sample size $f_1$ while the time to process $S_2$ is linear to $f_1$ and $f_2$. $T_2$ will include the time to scan $S_2$ as many times as needed. Examining the following theorem facilitates maximizing $f_1*f_2$ for a nested join.

Theorem 1:

When $f_2 = 1$, $\max(f_1 * f_2) = f_1 = T/(T_1 + T_2)$.

Examination:

Assume $f_2 < 1$, $T = f_1 * T_1 + f_1 f_2 * T_2 > f_1 * f_2 T_1 + f_1 * f_2 * T_2$ $= f_1 * f_2 * (T_1 + T_2)$.

$=> f_1 * f_2 < T/(T_1 + T_2)$.

Therefore, when $f_2 = 1$, $\max(f_1 * f_2) = f_1 = T/(T_1 + T_2)$.

Theorem 1 indicates that the sample clause may be placed in the outer relation. By sampling the outer table, the inner table in effect may be sampled. Therefore, sampling the outer table facilitates maximizing $f_1*f_2$. The same conclusion can be extended to the case of multi-table nested loop joins. Therefore example systems (e.g., 100, 200) and methods (e.g., 300, 400) may provide a rewritten query designed to sample an outer table but not an inner table in a join. The total time to perform n-table nested loop joins can be written as follows:

$$T=f_1*T_1+f_1*f_2*T_2+f_1*f_2*f_3*T_3+\ldots+(\Pi f_i)*T_n.$$

Theorem 2:

When $f_i=1$, where $2 \leq i \leq n$, $$\max(\Pi f_i)=f_1=T/\Sigma T_i.$$

To maximize the sample size f, the outer-most relation may be sampled in a pipelined multi-table nested loop join and other inner relations may be processed as before. Thus, in one example, an optimal plan may apply only the reduction factor of the outer relation (e.g., $f_1$) to stages in the pipeline.

The same approach can be applied when the inner relation takes an index unique scan, or the index nested loop join is performed. In these cases, only row sampling methods may be applied to the inner relation. Since the reduction factors $f_2, \ldots, f_n$ do not affect $T_1$, in one example an optimal plan makes $f_2=f_3=\ldots=fn=1$ regardless of row sampling or block sampling methods taken in the inner relation. When only row sampling is available to the outer relation, which is the case when an index range scan is followed by a table access by index, then $T_1$ is divided into two parts: $TC_1$: the constant portion of $T_1$ (e.g., the time to perform an index range scan), and $TF_1$: the flexible portion of $T_1$ that can be affected by $f_1$ (e.g., the time to perform a table access by index). This leads to:

$$T_1=TC_1+TF_1.$$

$$T=TC_1+f_1*TF_1+f_1*f_2*T_2+f_1*f_2*f_3*T_3+\ldots+(\Pi f_i)*T_n.$$

Corollary 3:
When $f_i=1$, where $2 \leq i \leq n$, $$\max(\Pi f_i)=f_1=(T-TC_1)/(\Sigma T_i-TC_1).$$

In one example, when row sampling is applied to the outer relation, example systems and methods may deduct the constant portion of $T_1$ from the time constraint and then compute the sample size $f_1$.

Now consider a situation where a hash join is used to join $S_1$ and $S_2$, where $S_1$ and $S_2$ are block-sampled directly from $R_1$ and $R_2$. In the hash join situation, results less than a maximum for $f_1*f_2$ may be achieved. In one example, the hash function may be performed on the outer table and then the hash function may be performed on the inner table and then the join may be performed. The total time may equal $T_{outer}+T_{inner}$, which may equal $f_1*Toriginal_{outer}+f_2*Toriginal_{inner}$. In one example, sample sizes of the tables are selected so that tables get approximately equal shares of the available time. In this case, the total time can be computed according to:

$$T=t_1(f_1)+t_2(f_2)=f_1*T_1+f_2*T_2.$$

To maximize $f_1*f_2$, examine the following:
Theorem 4:
  1. If $f_1<1$ and $f_2<1$, then $$t_1(f_1)=t_2(f_2)=f_1*T_1=f_2*T_2=\tfrac{1}{2}*T,$$

$$\max(f_1*f_2)=(T*T)/(4*T_1*T_2);$$

2. If $f_2=1$, then $t_1(f_1) \geq t_2(f_2)$ or $f_1*T_1 \geq T_2$, $$\max(f_1*f_2)=f_1=(T-T_2)/T_1;$$

3. If $f_1=1$, then $t_2(f_2) \geq t_1(f_1)$ or $f_2*T_2 \geq T_1$, $$\max(f_1*f_2)=f_2=(T-T_1)/T_2;$$

Examination:
  Consider a first case where $f_1<1$ and $f_2<1$. Assume when $f_1=g_1$ and $f_2=g_2$, that $f_1*f_2$ is maximized. Thus, other values meeting the time constraint (e.g., $h_1*h_2$) should be not larger than $g_1*g_2$. Take:

$h_1 = (g_1 * T_1 + g_2 * T_2)/(2 * T_1)$.

$h_2 = (g_1 * T_1 + g_2 * T_2)/(2 * T_2)$.  (Eq. 2)

Assume $T_1 \geq T_2$, then $h_1 = (g_1 * T_1 + g_2 * T_2)/(2 * T_1)$ $= g_1/2 + (g_2 * T_2)/(2 * T_1) < 1/2 + \dfrac{1}{2} = 1.$ -continued Assume $h_1 < 1$. Therefore, $$h_1 * h_2 = ((g_1 * T_1 + g_2 * T_2) * (g_1 * T_1 + g_2 * T_2)) /$$
$$(4 * T_1 * T_2) \le g_1 * g_2.$$
$$\Rightarrow (g_1 * T_1)^{\wedge}2 + (g_2 * T_2)^{\wedge}2 + 2 * g_1 * T_1 *$$
$$g_2 * T_2 \le 4 * g_1 * T_1 * g_2 * T_2.$$
$$\Rightarrow (g_1 * T_1 - g_2 * T_2)^{\wedge}2 \le 0.$$
$$\Rightarrow g_1 * T_1 - g_2 * T_2 = 0, \text{ or}$$
$$g_1 * T_1 = g_2 * T_2 = \frac{1}{2} * T.$$

To prove $h_2 < 1$, take $$m_2 = 1.$$
$$m_1 = (g_1 * T_1 + g_2 * T_2 - m_2 * T_2)/T_1$$
$$= (g_1 * T_1 + g_2 * T_2 - T_2)/T_1$$
$$= g_1 + (g_2 - 1) * T_2 / T_1.$$

Because $$m_1 * m_2 \le g_1 * g_2.$$

Therefore, $$g_1 + (g_2 - 1) * T_2 / T_1 \le g_1 * g_2.$$
$$\Rightarrow (g_2 - 1) * T_2 / T_1 \le (g_2 - 1) * g_1.$$
$$\Rightarrow \text{because } (g_2 - 1) < 0,$$
$$T_2 / T_1 \ge g_1, \text{ or } (g_1 * T_1)/T_2 \le 1. \quad \text{(Eq. 13)}$$

Go back to (2), $$h_2 = (g_1 * T_1 + g_2 * T_2)/(2 * T_2)$$
$$= (g_1 * T_1)/(2 * T_2) + g_2/2.$$

Because (13) and $g_2/2 < 1/2$,
$h_2 < 1$.

Therefore, if $f_1 < 1$ and $f_2 < 1$, in one example, systems and methods may make $f_1 * T_1 = f_2 * T_2 = \frac{1}{2} * T$ to have $\max(f_1 * f_2) = (T*T)/(4*T_1*T_2)$.

Now consider a second case where $f_2 = 1$. Assume that $f_1 * T_1 < T_2$.

$$T = f_1 * T_1 + T_2 < T_2 + T_2 = 2 * T_2.$$
$$\Rightarrow (T - 2 * T_2) * (T - 2 * T_2) > 0.$$
$$\Rightarrow T * T > 4 * (T - T_2) * T_2. \quad \text{(Eq. 18)}$$

Assume that when $f_1 = e_1$ and $f_2 = e_2$,
$$e_1 * T_1 = e_2 * T_2 = 1/2 * T.$$
Therefore, $$e_1 * e_2 = T * T / (4 * T_1 * T_2) \quad \text{(Eq. 20)}$$

And $$f_1 * f_2 = f_1 = (T - T_2)/T_1 = (T - T_2) * T_2 / (T_1 * T_2) \quad (21)$$

From (Eq. 18), (Eq. 20), and (Eq. 21), obtain
$$f_1 * f_2 < e_1 * e_2.$$

Therefore, if $f_2 = 1$, then in one example, systems and methods may make $f_1 * T_1 \ge T_2$ to maximize $f_1 * f_2$.

A third case exists where $f_1 = 1$. This case can be analyzed similarly to the second case. Furthermore, this processing can be extended to in-memory multi-table hash joins. Assume that the total time to perform in-memory n-table hash joins can be written as:

$$T = f_1 * T_1 + f_2 * T_2 + f_3 * T_3 + \ldots + f_n * T_n.$$

To maximize $f_1 * f_2 * \ldots * f_n$, example systems and methods may use:

Theorem 5:

If $f_i < 1$ and $f_j < 1$, then $$t_i(f_i) = t_j(f_j) = f_i * T_i = f_j * T_j.$$

When row sampling is applied for some relations, example systems and methods will have the constant and flexible portions of the time to process these relations. Assume $S_i$ and $S_j$ are row-sampled from $R_1$ and $R_2$ while $S_k$ is block-sampled from $R_k$.

$$T_i = TC_i + TF_i.$$

$$T_j = TC_j + TF_j.$$

$$T = f_1 * T_1 + \ldots + TC_i + f_i * TF_i + \ldots + TC_j + f_j * TF_j + \ldots + f_k * T_k + \ldots + f_n * T_n.$$

Corollary 6:

If $f_i < 1$, $f_j < 1$ and $f_k < 1$,
then $f_i * TF_i = f_j * TF_j = f_k * T_k$ or $$t_i(f_i) - TC_i = t_j(f_j) - TC_j = t_k(f_k).$$

Therefore, when row sampling is applied to the some relations, example systems and methods may only use the flexible portions of $T_i$ and $T_j$ to compute the sample size $f_i$ and $f_j$. When computational resources (e.g., memory) are not sufficient for a hash join operation, in-memory data may be written to disk and reread multiple times. This hash join method, referred to as multi-pass hash join, has the time complexity of O(nlogn). In one example, equations obtained in Theorem 4, Theorem 5, and Corollary 6 may be used to choose which tables to sample and to compute sample sizes (e.g., to make $t_i(f_i)$ as close as $t_j(f_j)$ when $S_i$ and $S_j$ are block-sampled, to make $t_i(f_i) - TC_i$ as close as $t_j(f_j) - TC_j$ when $S_i$ and $S_j$ are row-sampled). The same technique may be applied to sort-merge join, which also has the time complexity of O(nlogn).

Example systems and methods may also process other operations or relations. Once again sampling methods may be pushed to the table scan or index scan as early as possible. Therefore, only selection and projection operations may be performed before the row sample method. For example, an index scan may first perform the selective access predicate, and then apply the row sample method. In other cases, the relational operations, including sort and group-by operations, are normally performed after sampling.

Schemes for union, difference, and intersection are now described. For SAMPLE($R_1$ union $R_2$, f), example systems and methods may produce a rewritten query that simplifies the operation to be SAMPLE($R_1$, $f_1$) union SAMPLE($R_2$, $f_2$) with $f_1 = f_2$. Therefore, $t_1(f_1)/t_2(f_2) = (f_1 * T_1)/(f_2 * T_2) = T_1/T_2$ when the cost function is linear. Using this approach, tables may receive relatively similar ratios of time. For SAMPLE ($R_1 - R_2$, f) example systems and methods may provide a rewritten query that simplifies the operation be SAMPLE($R_1$, $f_1$)-$R_2$. Only $R_1$ is sampled to avoid incorrect results. For SAMPLE($R_1$ intersect $R_2$, f), example systems may provide a rewritten query that simplifies the operation to be SAMPLE ($R_1$, $f_1$) intersect SAMPLE($R_2$, $f_2$). A goal of this approach may be to maximize $f_1 * f_2$. This is similar to the join operation.

Example systems and methods may also receive queries to rewrite that include sub-queries. When a sub-query with an aggregate function appears in a predicate condition, example systems and methods may try to not push the sample operation into the sub-query until other options are used up because the predicate condition can change due to the approximate aggregate value and some incorrect rows can be returned as the result. For example, in the following query, the sample operation may only be performed on the outer employees table if the sub-query takes less than 10 seconds:

---
Q4:
---
SELECT *
FROM employees outer
WHERE outer.salary >
    (SELECT AVG(inner.salary)
    FROM tax_return inner)
SOFT TIME CONSTRAINT (10);
---

Example systems and methods may try to not approximate (sample) a sub-query because of potential relationship errors. Instead, example systems and methods may try to acquire the best result possible for a sub-query. Thus, accuracy in a predicate may be given priority.

The time allocated to different stages may be determined through linear interpolation. For example, assuming an original query takes 30 seconds (18 seconds for the sub-query block and 12 seconds for the top query block) and a time constraint of 10 seconds exists, then in one example, constraint rewrite logic 240 may select limitation parameters (e.g., row numbers, sample percentage) so that 6 (18*10/30) seconds are spent on the sub-query block and 4 (12*10/30) seconds are spent on the top query block. When the time constraint is increased to 20 seconds, the sub-query may be executed completely in 18 seconds leaving 2 seconds for the top query. However, the predicate used in the top query will be exact thereby producing accurate results.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on.

It has proven convenient at times, principally for reasons of common usage, to refer to these signals as bits, values, elements, symbols, characters, terms, numbers, or so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. Flow diagrams illustrate functional information one skilled in the art could use to design/fabricate circuits, generate software, or use a combination of hardware and software to perform the illustrated processing.

Figure 3:
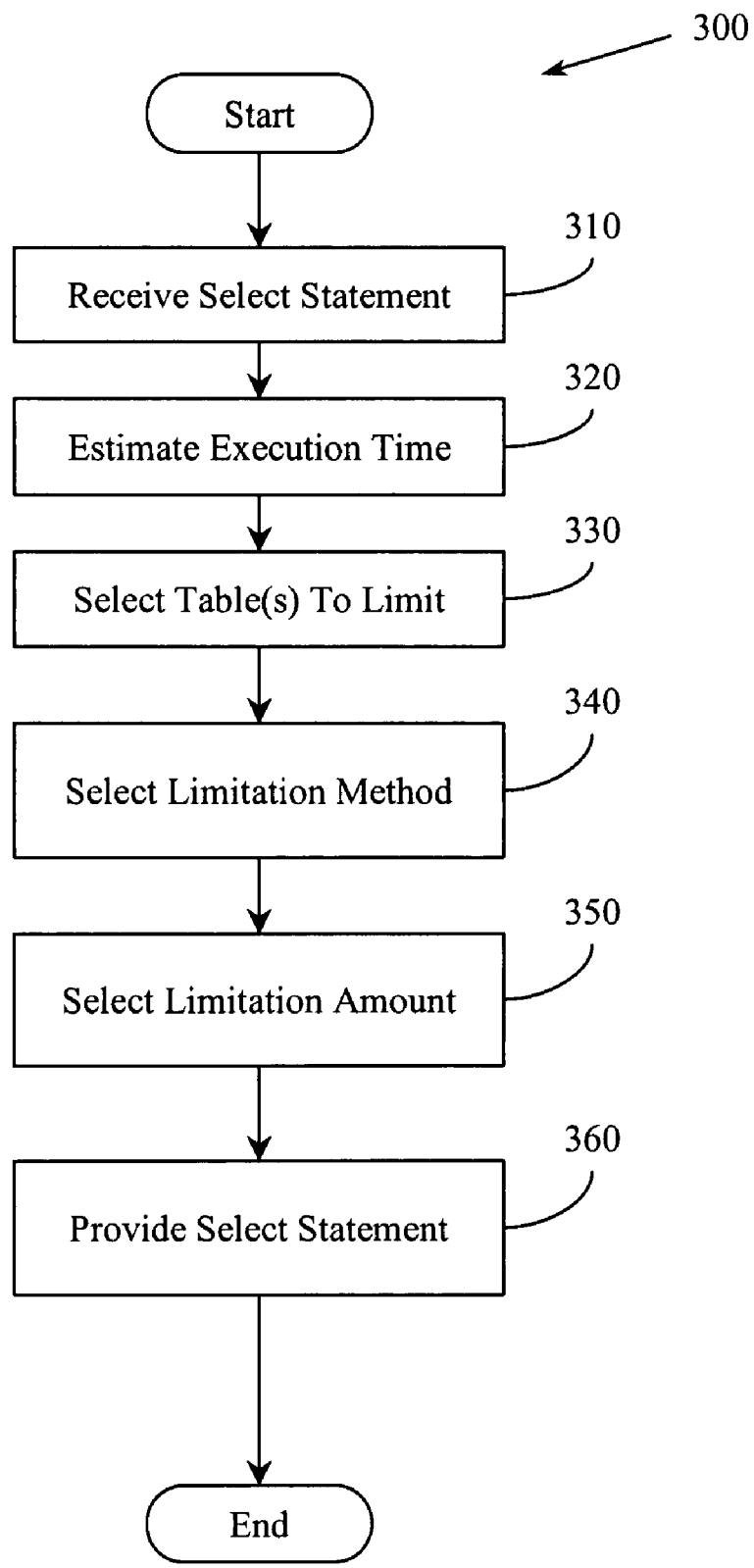
FIG. 3 illustrates an example method associated with supporting time-constrained queries.

FIG. 3 illustrates a method 300 associated with supporting time-constrained queries. Method 300 may include, at 310, receiving a select statement that has a soft time constraint clause. The select statement, which may be an SQL statement, may describe conditions for selecting rows from a set of tables. Since the select statement includes a soft time constraint clause, method 300 may also include, at 320, estimating an execution time for the select statement. If the estimated execution time is less than the soft time constraint, then the select statement may not be manipulated. If the estimated execution time exceeds the soft time constraint, then additional processing may occur to produce a rewritten query designed to execute within the time period specified in the soft time constraint clause.

For example, method 300 may include, at 330, selecting a subset of tables from the set of tables. This subset includes tables from which row selection is to be limited in a rewritten query. Which tables are to be selected may depend, at least in part, on the soft time constraint clause and the execution time estimate. In one example, if the original execution time estimate is much greater than the soft time constraint clause and the select statement includes a set of tables, then multiple tables may be selected to be limited. Which tables are selected may depend on table size and/or on table relationships (e.g., join relations, sub-query relations).

Method 300 may also include, at 340, selecting a method by which row selection from the set of tables is to be limited. In one example, the method selected may be based, at least in part, on the soft time constraint clause and the execution time estimate. For example, a first relationship between the soft time constraint and the execution time estimate may lead to sampling (e.g., row, block) while a second relationship between the soft time constraint and the execution time estimate may lead to row number limitations. In another example, the row selection limitation method selected may be based, at least in part, on relationships between tables. For example, relationships including joins, sub-queries, and so on, may determine whether table sampling limitations will be selected. In one example, the received select statement may include a clause that specifies the method by which row selection is to be limited. In one example, if no such clause is present, a default method (e.g., sampling) may be selected.

In one example, sample clauses may be applied to multiple table accesses. In another example, only a single row number limitation clause may be applied to an entire query. Consider the query:

select*from t1, t2, t3
    where t1.c2=t2.c2 and t1.c3=t3.c2
    order by t1.c1, t2.c1, t3.c1
    time constraint (50) with partial result;
    In one example, where a single row number limitation is to be added, this may be rewritten as:
    select*from (select*from t1, t2, t3
        where t1.c2=t2.c2 and t1.c3=t3.c2
        order by t1.c2 t2.c1, t3.c1)
    where rownum<1000;
    In another example, where multiple sample clauses may be employed, this query may be rewritten as:
        select*from t1 sample block (10), t2 sample block (30), t3 sample block (25)
        where t1.c2=t2.c2 and t1.c3=t3.c2
        order by t1.c1, t2.c1, t3.c1;

Method 300 may also include, at 350, selecting an amount by which row selection from a member(s) of the subset of tables is to be limited. Once again the degree to which selection will be limited may be based, at least in part, on a relationship between the soft time constraint clause and the execution time estimate. A larger discrepancy may lead to greater limitation while a smaller discrepancy may lead to lesser limitation. The degree to which selection may be limited may also be based on a relationship between tables. For example, when two tables are joined on a foreign key, selection on the fact table may be limited while selection on a non-fact table may not be limited since limiting selection in the fact table in effect limits selection on the non-fact table.

Method 300 may also include, at 360, providing a second (e.g., rewritten, manipulated) select statement that is based on the first (e.g., received) select statement. The second select statement may have at least one additional clause to limit selection of rows from the subset of tables. This clause may specify the amount by which selection is to be limited and the method by which selection is to be limited. Thus, method 300 receives a select statement, determines whether, how, and by how much row selection is to be limited, and then provides a rewritten select statement related to the received query, where the rewritten select statement is to execute within the soft time constraint specified in the received select statement.

While a linear flow is illustrated in method 300, it is to be appreciated that certain actions taken in method 300 may be repeated (e.g., iteratively), until a certain threshold condition (e.g., execution time<soft constraint) or an error condition (e.g., execution time cannot be made<soft constraint) are encountered. Examples of this type of processing are provided in connection with method 400 (FIG. 4).

While FIG. 3 illustrates various actions occurring in serial, it is to be appreciated that various actions illustrated in FIG. 3 could occur substantially in parallel. By way of illustration, a first process could receive select statements and make an initial execution time estimate. A second process could select tables to limit while a third process could select limitation methods and amounts and a fourth process could rewrite select statements based on estimates related to select limitation methods and amounts. While four processes are described, it is to be appreciated that a greater and/or lesser number of processes could be employed and that lightweight processes, regular processes, threads, and other approaches could be employed.

Figure 4:
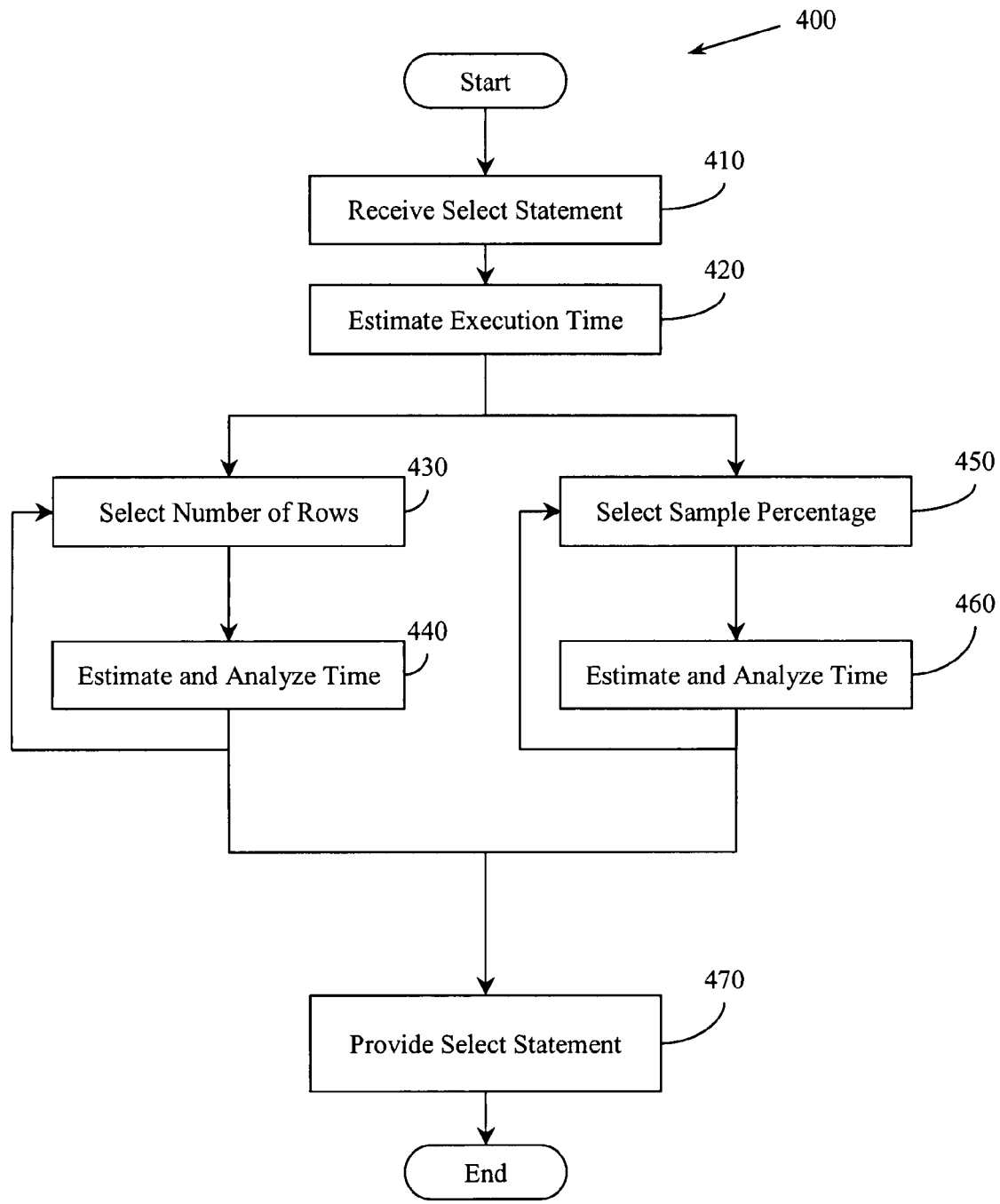
FIG. 4 illustrates another example method associated with supporting time-constrained queries.

FIG. 4 illustrates a method 400 with some actions similar to those described in connection with method 300 (FIG. 3). For example, method 400 includes receiving a select statement at 410, making an initial time estimate at 420, and providing a select statement at 470. However, method 400 illustrates two different paths for selecting row limitations.

In a first path, method 400 includes, at 430, selecting a number of rows to select based on a comparison of the initial estimate and the soft time constraint. Method 400 may then proceed to iteratively propose and analyze at 440 candidate numbers of rows to which selection will be limited until a time estimate for a query with a limited number of rows to be selected falls within a threshold amount of the soft time constraint. This analysis may include root finding and may include, for example, selecting a number of rows to which a select statement will be limited based on the root finding and/or on previous choices and estimating the time to perform that select statement. In one example, if the 430-440 loop fails to find a suitable number of rows, then an error method may be generated and method 400 may terminate.

In a second path, method 400 includes, at 450, selecting a sample percentage to which row selection will be limited based on a comparison of the initial estimate and the soft time constraint. Method 400 may then proceed to iteratively propose and analyze candidate sample percentages at 460 until a time estimate falls within a threshold amount of the soft time constraint. This analysis may include iterative root finding and may include, for example, selecting a sample percentage to which the select statement will be limited and estimating the time to perform that select statement. In one example, if the 450-460 loop fails to find a suitable number of rows, an error method may be generated and method 400 may terminate.

With either an appropriate row number limitation or an appropriate sample size limitation, method 400 may then conclude, at 470, by providing a rewritten select statement that has the time constraint removed but which includes either a row number limitation clause or a sample percentage clause.

Figure 5:
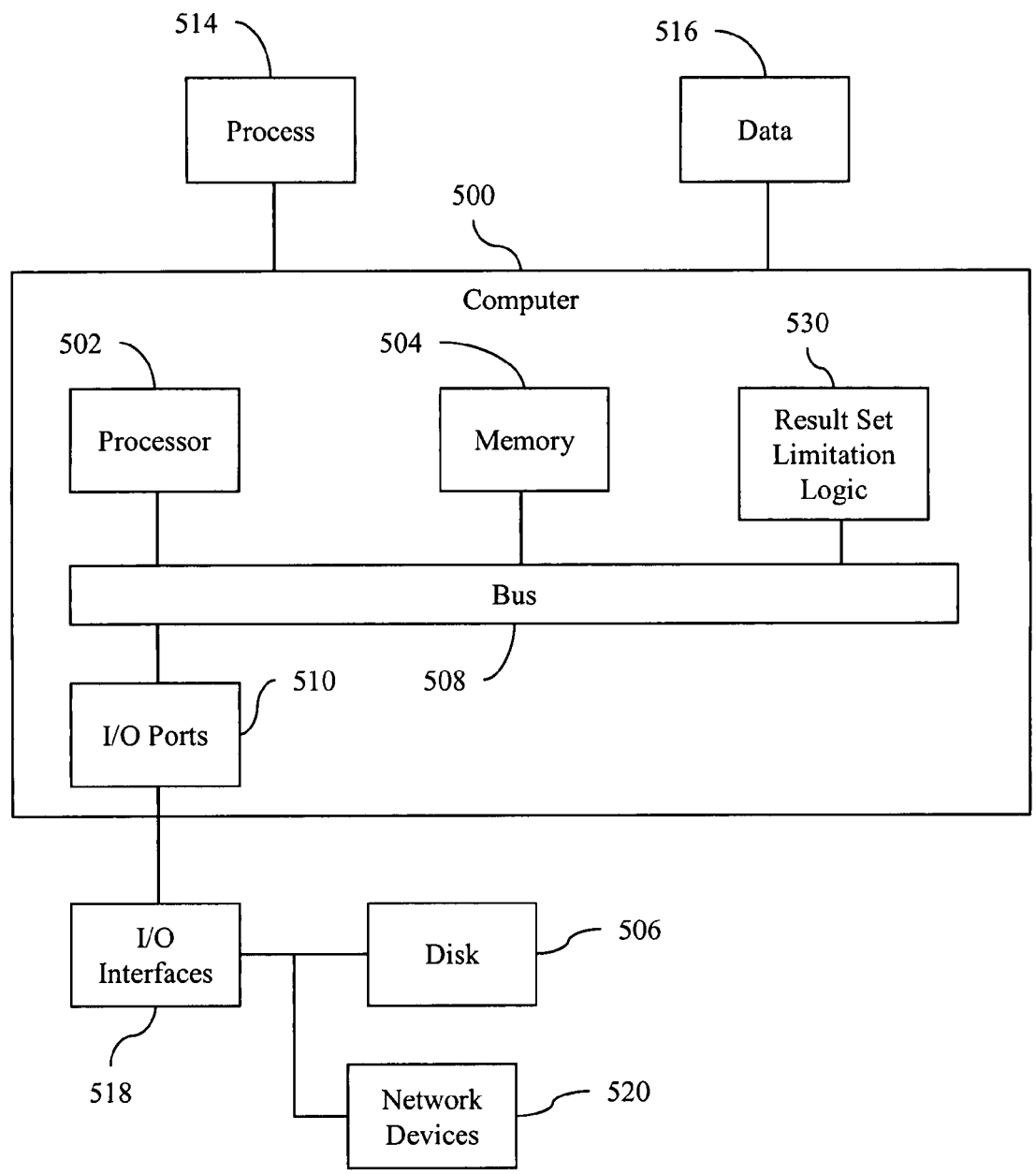
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, the computer 500 may include a result set limitation logic 530. In one example, logic 530 may include means (e.g., hardware, software in execution, firmware) for computing a predicted execution time for a query having a soft time constraint. Since the logic 530 can predict an execution time for a query, logic 530 may also include means (e.g., hardware, software in execution, firmware) for rewriting the query. The rewriting may be based, at least in part, on the predicted execution time and the soft time constraint. The rewriting may include, for example, replacing the soft time constraint with a result set limitation clause.

Generally describing an example configuration of the computer 500, the processor 502 can be a variety of various processors including dual microprocessor and other multiprocessor architectures. The memory 504 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 can include, but is not limited to, devices like a magnetic disk drive, a solid state disk drive, a floppy disk drive, a tape drive, a Zip drive, a flash memory card, and/or a memory stick. Furthermore, the disk 506 can include optical drives like a CD-ROM, a CD recordable drive (CD-R drive), a CD rewriteable drive (CD-RW drive), and/or a digital video ROM drive (DVD ROM). The memory 504 can store processes 514 and/or data 516, for example. The disk 506 and/or memory 504 can store an operating system that controls and allocates resources of the computer 500. Disk 506 and/or memory 504 may also store data 516.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and so on. The input/output ports 510 can include but are not limited to, serial ports, parallel ports, and USB ports.

The computer 500 can operate in a network environment and thus may be connected to network devices 520 via the i/o devices 518, and/or the i/o ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 520 can connect to WAN technologies including, but not limited to, point to point links, circuit switching networks (e.g., integrated services digital networks (ISDN), packet switching networks, digital subscriber lines (DSL)).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system, comprising:
   a non-transitory computer-readable medium storing instructions configured as receive logic to receive a first query having a soft time constraint and an acceptable nature of results constraint that specifies one of, whether a partial result is to be returned, and whether an approximate result is to be returned;
   an analytics logic to provide a predicted execution time for a query based, at least in part, on the acceptable nature of results constraint; and
   a constraint rewrite logic to selectively produce a rewritten query based on the first query, the rewritten query having a restricted result clause, where the restricted result clause depends, at least in part, on the predicted execution time and specifies one of, a number of rows to which row selection is to be limited by the rewritten query, and a sample percentage to which row selection is to be limited by the rewritten query.

2. The system of claim 1,
   where the constraint rewrite logic is configured to use the soft time constraint as an upper bound for constraining an execution time of the rewritten query.

3. The system of claim 1,
   where the receive logic is configured to identify the soft time constraint from the first query;
   where the analytics logic is configured to generate the predicted execution time based, at least in part, on the soft time constraint; and
   where the restricted result clause depends, at least in part, on the soft time constraint and replaces the soft time constraint in the rewritten query.

4. The system of claim 1, where the constraint rewrite logic is to iteratively:
   choose different candidate numbers of rows to be selected;
   determine a set of predicted execution times associated with queries limited to the candidate numbers of rows; and
   manipulate the rewritten query to include a row number clause to cause a limited number of rows to be selected, where the row number clause is based on a relation between a member of the set of predicted execution times and the soft time constraint.

5. The system of claim 4, where the constraint rewrite logic is to choose the different candidate numbers of rows by root finding.

6. The system of claim 5, where the root finding solves for a root of $F_Q(R)-T=0$, where:
   $F_Q(R)$ represents the execution time for the rewritten query using the specified result set size;
   R represents the result set size; and
   T represents the amount of time specified in the soft time constraint.

7. The system of claim 1 where the receive logic, the analytics logic, and the constraint rewrite logic comprise instructions stored in a non-transitory computer-readable medium.

8. The system of claim 1, where the first query concerns two or more tables and where the constraint rewrite logic is to generate the rewritten query to divide a time available to execute the rewritten query substantially equally between the two or more tables.

9. The system of claim 1, where the constraint rewrite logic is to iteratively:
choose different candidate sample percentages to control a number of rows to select by the rewritten query;
determine a set of predicted execution times associated with queries limited by the candidate sample percentages; and
generate the rewritten query to include a sample clause to cause a limited number of rows to be provided in a sample, where the sample percentage is based on a relation between a member of the predicted execution times and the soft time constraint.

10. The system of claim 9, where the constraint rewrite logic is to choose the different candidate sample percentages for a single table query using root finding.

11. The system of claim 10, where the root finding solves for a root of $F_Q(S)-T=0$, where:
$F_Q(S)$ represents the execution time for the rewritten query using the specified sample percentage;
S represents the sample percentage; and
T represents the amount of time specified in the soft time constraint.

12. The system of claim 1, where the first query involves a join on a foreign key of two tables, where the constraint rewrite logic is to identify a fact table and a non-fact table in the two tables, and where the constraint rewrite logic is to manipulate the rewritten query to first limit row selection in the fact table and then to join the results of the limited row selection to the non-fact table.

13. The system of claim 1, where the first query involves a join of two tables not on a foreign key, and where the constraint rewrite logic is to manipulate the rewritten query to first limit row selection and then to join results of the limited row selection.

14. The system of claim 13, where the constraint rewrite logic is to maximize $f_1*f_2$, where $f_1$ represents the sample size of one of the two tables and $f_2$ represents the sample size of the other of the two tables.

15. The system of claim 1, where the first query includes one of, a hash join, and a sort-merge join, of a first table R1 and a second table R2, where f1 represents a sample size for R1 and f2 represents a sample size for R2, where T1 represents a time to process R1 and T2 represents a time to process R2, where S1 represents a sample of R1 and S2 represents a sample of R2, where t1 represents a time to process S1 and t2 represents a time to process S2; and
where the constraint rewrite logic is to produce the rewritten query so that t1=t2 and t1+t2<the time specified by the soft time constraint.

16. The system of claim 14, where the first query includes a nested loop join and the constraint rewrite logic is to identify one of the two tables to join as an outer table and to identify one of the two tables to join as an inner table, the constraint rewrite to acquire a sample from the outer table, and then to join the sample from the outer table to the inner table.

17. The system of claim 1, where the first query includes a union operation between a first table R1 and a second table R2, and where the constraint rewrite logic is to configure the rewritten query with a sample(R1, f1) union sample(R2, f2) clause with f1=f2, where f1 represents a sample size for R1 and f2 represents a sample size for R2.

18. The system of claim 1, where the first query includes a difference operation between a first table R1 and a second table R2, and where the constraint rewrite logic is to configure the rewritten query with a sample(R1, f1) difference R2 clause, where f1 represents a sample size for R1.

19. The system of claim 1, where the first query includes an intersection operation between a first table R1 and a second table R2, and where the constraint rewrite logic is to configure the rewritten query with a sample(R1, f1) intersect sample (R2, f2) clause, where f1*f2 is maximized, where f1 represents a sample size for R1 and f2 represents a sample size for R2.

20. The system of claim 1, where the first query includes a sub-query.

21. The system of claim 20, where the constraint rewrite logic is to produce the rewritten query so that a predicate in the sub-query is not sampled.

22. The system of claim 1, including an aggregate function logic to provide an estimated aggregate function and a related confidence function.

23. The system of claim 22, where the estimated aggregate function is one of, an estimated sum function, an estimated count function, and an estimated average function.

24. The system of claim 1, where the system receives the first query from one or more of, a decision support system, a mobile network application, and a radio frequency identification application, and where the system provides results within a time period that satisfies a service level agreement.

25. A non-transitory computer-readable medium storing processor executable instructions that when executed by a computer cause the computer to perform a method, the method comprising:
receiving a first select statement having a soft time constraint clause, the select statement describing a desired selection of one or more rows from a set of tables;
determining an execution time estimate for the first select statement;
selecting from the set of tables a subset of tables from which row selection is to be limited, where the subset of tables is selected based, at least in part, on the soft time constraint clause and the execution time estimate;
selecting a method by which row selection from a member of the subset of tables is to be limited, where the method selected is based, at least in part, on the soft time constraint clause and the execution time estimate;
selecting an amount by which row selection from a member of the subset of tables is to be limited, where the amount selected is based, at least in part, on the soft time constraint clause and the execution time estimate;
providing a second select statement having at least one additional clause to limit selection of rows from a member of the subset of tables by the selected amount according to the selected method, the second select statement being based on the first select statement;
selecting an initial number of rows to which row selection will be limited based on a comparison of the initial estimate and the soft time constraint; and
iteratively selecting and analyzing a subsequent number of rows to which row selection will be limited until a time estimate falls within a threshold amount of the soft time constraint, the subsequent number of rows being based on a previous number of rows, a time estimate associated with a previous number of rows, and the soft time constraint.

26. The computer-readable medium of claim 25, where the first select statement includes a clause that specifies the method by which row selection is to be limited;

where the a soft time constraint clause includes a soft time constraint; and the second select statement is provided in response to receiving the first select statement.

27. A non-transitory computer-readable medium storing processor executable instructions that when executed by a processor cause the processor to perform a method, the method comprising:

receiving a first select statement having a soft time constraint clause, the select statement describing a desired selection of one or more rows from a set of tables;

determining an execution time estimate for the first select statement;

selecting from the set of tables a subset of tables from which row selection is to be limited, where the subset of tables is selected based, at least in part, on the soft time constraint clause and the execution time estimate;

selecting a method by which row selection from a member of the subset of tables is to be limited, where the method selected is based, at least in part, on the soft time constraint clause and the execution time estimate;

selecting an amount by which row selection from a member of the subset of tables is to be limited, where the amount selected is based, at least in part, on the soft time constraint clause and the execution time estimate;

providing a second select statement having at least one additional clause to limit selection of rows from a member of the subset of tables by the selected amount according to the selected method, the second select statement being based on the first select statement;

selecting an initial sample percentage to which row selection will be limited for a member of the subset of tables based on a comparison of the initial estimate and the soft time constraint; and iteratively selecting and analyzing a subsequent sample percentage to which row selection will be limited for a member of the subset of tables until a time estimate falls within a threshold amount of the soft time constraint, the subsequent sample percentage being based on a previous sample percentage, a time estimate associated with a previous sample percentage, and the soft time constraint.

28. A system, comprising:

means for computing a predicted execution time for a query having a soft time constraint and an acceptable nature of results constraint that specifies one of, whether a partial result is to be returned, and whether an approximate result is to be returned; and means for rewriting the query based, at least in part, on the predicted execution time and the soft time constraint, where the rewriting includes replacing the soft time constraint with a result set limitation clause that specifies one of, a number of rows to which row selection is to be limited, and a sample percentage to which row selection is to be limited.

29. The system of claim 28, where the means for computing and the means for rewriting include a non-transitory computer-readable medium storing executable instructions that when executed perform at least the computing and the rewriting.

30. A non-transitory computer-readable medium storing computer executable instructions that when executed by a computer cause the computer to perform a method, the method, comprising:

computing a predicted execution time for a query having a soft time constraint and an acceptable nature of results constraint that specifies one of, whether a partial result is to be returned, and whether an approximate result is to be returned; and rewriting the query based, at least in part, on the predicted execution time and the soft time constraint, where the rewriting includes replacing the soft time constraint with a result set limitation clause that specifies one of, a number of rows to which row selection is to be limited, and a sample percentage to which row selection is to be limited.

* * * * *